(12) United States Patent
Arens

(10) Patent No.: US 10,288,181 B2
(45) Date of Patent: May 14, 2019

(54) VALVE FOR INFLATABLE APPARATUSES

(71) Applicant: Oase Outdoors ApS, Give (DK)

(72) Inventor: Henrik Arens, Bredsten (DK)

(73) Assignee: OASE OUTDOORS APS, Give (DK)

(*) Notice: Subject to any disclaimer, the term of this patent is extended or adjusted under 35 U.S.C. 154(b) by 48 days.

(21) Appl. No.: 15/404,421

(22) Filed: Jan. 12, 2017

(65) Prior Publication Data
US 2017/0328486 A1    Nov. 16, 2017

(30) Foreign Application Priority Data
May 11, 2016    (DK) .......................... PA 2016 00289

(51) Int. Cl.
| | | |
|---|---|---|
| F16K 15/03 | (2006.01) | |
| F16K 15/20 | (2006.01) | |
| A47C 27/08 | (2006.01) | |
| F16K 1/22 | (2006.01) | |
| A47G 9/10 | (2006.01) | |
| F16K 15/14 | (2006.01) | |
| F16K 15/18 | (2006.01) | |

(52) U.S. Cl.
CPC .......... *F16K 15/202* (2013.01); *A47C 27/084* (2013.01); *A47G 9/1027* (2013.01); *F16K 1/222* (2013.01); *F16K 1/223* (2013.01); *F16K 15/148* (2013.01); *F16K 15/185* (2013.01); *F16K 15/207* (2013.01); *Y10T 137/3631* (2015.04); *Y10T 137/5153* (2015.04); *Y10T 137/784* (2015.04)

(58) Field of Classification Search
CPC ......... Y10T 137/5196; Y10T 137/5153; Y10T 137/789; Y10T 137/3584; Y10T 137/36; Y10T 137/3631; Y10T 137/3646; Y10T 137/784
See application file for complete search history.

(56) References Cited

U.S. PATENT DOCUMENTS

| | | | | |
|---|---|---|---|---|
| 3,363,650 A * | 1/1968 | Scaramucci | .......... | F16K 15/188 137/269.5 |
| 3,474,818 A * | 10/1969 | Hartman | ................. | F16K 5/045 137/269.5 |
| 3,565,099 A * | 2/1971 | Huber | ................... | F16K 5/0407 137/269.5 |
| 4,589,441 A * | 5/1986 | Campau | ................. | B63B 35/26 137/269.5 |
| 4,601,467 A * | 7/1986 | Gvoich | ............. | A63B 21/0083 137/269.5 |

(Continued)

FOREIGN PATENT DOCUMENTS

| | | |
|---|---|---|
| DE | 20 2015 106 699 | 4/2016 |
| JP | 2000088124 | 3/2000 |
| JP | 2002081553 | 3/2002 |

OTHER PUBLICATIONS

European Search Report dated Sep. 13, 2017 for European Application No. EP17158041.

*Primary Examiner* — Robert K Arundale
(74) *Attorney, Agent, or Firm* — Hunton Andrews Kurth LLP; David Bradin

(57) ABSTRACT

The present invention relates to a valve for inflatable apparatuses. The valve comprises a housing, a sealing disc and a handle. The handle is coupled to the sealing disc, and is adapted for rotating the sealing disc within the housing.

10 Claims, 5 Drawing Sheets

(56) References Cited

U.S. PATENT DOCUMENTS

| | | | | |
|---|---|---|---|---|
| 4,770,413 | A * | 9/1988 | Green | A63B 23/18 |
| | | | | 137/269.5 |
| 4,989,631 | A * | 2/1991 | Harbin | F16K 5/0407 |
| | | | | 137/15.07 |
| 5,345,630 | A | 9/1994 | Healy | |
| 5,372,109 | A | 12/1994 | Thompson et al. | |
| 6,698,717 | B1 * | 3/2004 | Brookshire | F02D 9/1045 |
| | | | | 251/305 |
| 9,693,842 | B2 * | 7/2017 | Thomas | A61C 1/0061 |
| 2004/0182447 | A1 * | 9/2004 | Nicolino | F16K 15/148 |
| | | | | 137/513.5 |
| 2008/0083409 | A1 * | 4/2008 | Hamaguchi | A61M 11/06 |
| | | | | 128/200.24 |
| 2008/0157019 | A1 * | 7/2008 | Lin | F16K 15/20 |
| | | | | 251/324 |

\* cited by examiner

VALVE FOR INFLATABLE APPARATUSES

TECHNICAL FIELD OF THE INVENTION

The present invention relates to valves for inflatable apparatuses, and specifically for self-inflating apparatuses, such as mats, mattresses, and pillows.

BACKGROUND OF THE INVENTION

Camp mats are commonly used in camping and other outdoor activities, as well as indoor activities, to provide added comfort when sleeping in a tent, on the ground or on a floor or other hard surface. Self-inflating mats comprises an open cell foam core covered with an air impervious material having a fabric exterior, and a valve for inflating and deflating. A general problem with self-inflating mats is that the cell foam core forces air into the mat at the same time the user is trying to deflate it, which makes the deflation process tedious and cumbersome.

SUMMARY OF THE INVENTION

It is an object of the present invention to provide an inflatable apparatus that is easy to deflate.

One aspect relates to a valve for inflatable apparatuses comprising:
a housing with a first opening and a second opening, and adapted for being mounted to an inflatable apparatus such that the second opening faces the lumen of said inflatable apparatus;
a sealing disc adapted for rotating within the housing; and
a handle coupled to the sealing disc, and adapted for rotating the sealing disc within the housing;
wherein the sealing disc comprises a) a perforated body member with opposed first and second surface sides, and a side edge, and wherein one or more perforations extend through the sealing disc from the first surface side to the second surface side; and b) a cover plate adapted for covering the one or more perforations in the body member on the first surface side;
wherein at least a part of the cover plate may be lifted away from the body member when pressurized air is applied to the second surface side of the body member, such that air may pass through the one or more perforations;
wherein the sealing disc is configured such that the side edge can releasably engage with the inner surface side of the housing such that air passage from the first opening and towards the second opening, or vice versa, is directed through the one or more perforations in the body member.

The present invention relates to a valve for inflatable apparatuses. The valve comprises a housing, a sealing disc and a handle. The handle is coupled to the sealing disc, and is adapted for rotating the sealing disc within the housing.

The housing comprises a first opening and a second opening, and is adapted for being mounted to an inflatable apparatus such that the second opening faces the lumen of the inflatable apparatus into which it is mounted. The first opening faces the surrounding atmosphere.

In one or more embodiments, the first opening of the housing is configured and dimensioned as a mouthpiece. This is an advantage when a user wants to inflate the inflatable apparatus by blowing air into its lumen.

In one or more embodiments, the housing extends laterally into two oppositely directed plates or sheets. This is to allow for a better fastening of the housing/valve to the inflatable apparatus, more specifically to the air impervious material having a fabric exterior.

The sealing disc is adapted for rotating within the housing, and comprises a perforated body member and a cover plate. The perforated body member has opposed first and second surface sides, and a side edge. One or more perforations (holes or channels) extend through the sealing disc from the first surface side to the second surface side. The sealing disc is configured such that the side edge can releasably engage with the inner surface side of the housing, such that air passage from the first opening and towards the second opening, or vice versa, is directed through the one or more perforations in the body member.

The cover plate is adapted for covering the one or more perforations in the body member on the first surface side. At least a part of the cover plate may be lifted away from the body member when pressurized air is applied to the second surface side of the body member, such that air may pass through the one or more perforations. Hence, depending on the position of the body member within the housing: a) air may pass relatively unhindered through the housing into or out of the lumen of the inflatable apparatus into which the valve is mounted, as the side edge of the body member is in a released position from the inner surface side of the housing; or b) when the second surface side of the body member faces the first opening of the housing; air may pass through the housing via the one or more perforations into the lumen of the inflatable apparatus into which the valve is mounted, as the side edge of the body member is in an engaged position with the inner surface side of the housing; or c) when the second surface side of the body member faces the second opening of the housing; air may pass through the housing via the one or more perforations out of the lumen of the inflatable apparatus into which the valve is mounted and into the surrounding atmosphere, as the side edge of the body member is in an engaged position with the inner surface side of the housing. The a) position is especially suitable for inflating the inflatable apparatus. The b) position is especially suitable for the situation where a user wants to add a little more air into the lumen of the inflatable apparatus without air escaping out. The c) position is especially suitable for deflating the inflatable apparatus without air entering into the lumen of the inflatable apparatus when pausing during packing and/or folding. This is especially a problem for self-inflating apparatuses.

In one or more embodiments, the cover plate is made from a flexible material. In the present context, the term "flexible material" is understood to include one or more of any of the following: elastomers, foamed polymeric materials, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art. In various embodiments, part, parts, or all of a flexible material can be coated or uncoated, treated or untreated, processed or unprocessed, in any manner known in the art.

In one or more embodiments, the cover plate is made from a non-porous material. This is to avoid that air may leak through the material.

In one or more embodiments, the cover plate is anchored at the center of the body member.

In one or more embodiments, the inner surface side of the housing comprises a groove configured for receiving the side edge of the sealing disc.

In one or more embodiments, the handle is coupled to the sealing disc and rotatably coupled to the housing such that its relative position to the housing reflects the position of the side edge of the sealing disc.

Another aspect relates to an inflatable apparatus comprising a valve according to the present invention.

In one or more embodiments, the inflatable apparatus is a self-inflating apparatus.

It should be noted that embodiments and features described in the context of one of the aspects of the present invention also apply to the other aspects of the invention.

DETAILED DESCRIPTION OF THE INVENTION

Figure 1:
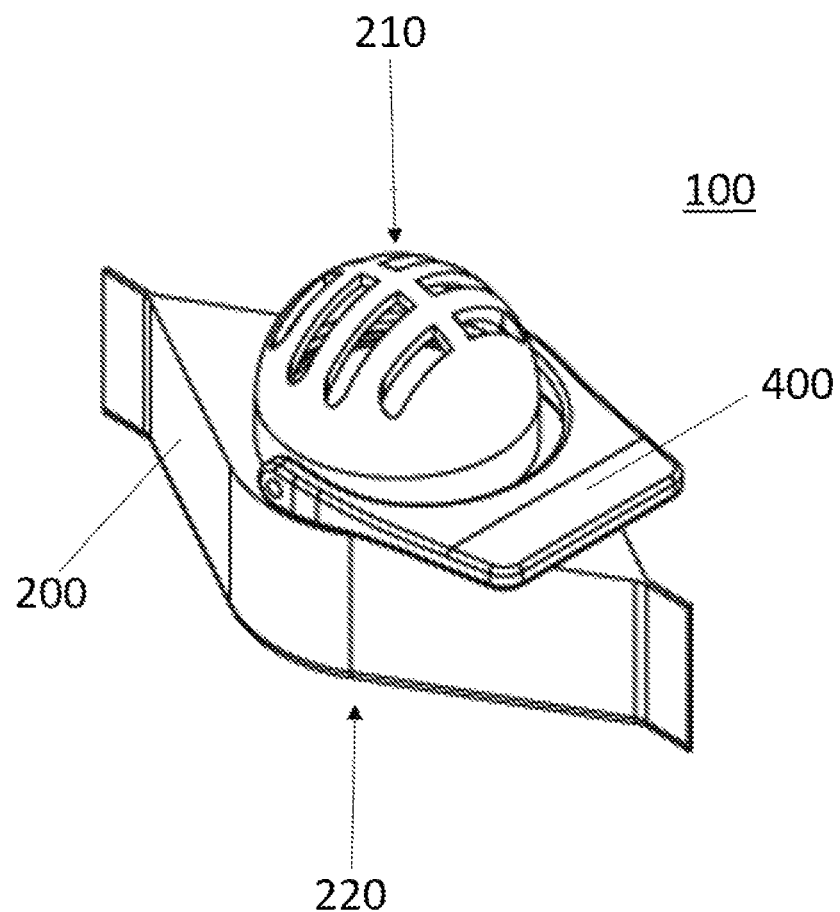
FIG. 1 shows a perspective view of valve for inflatable apparatuses in accordance with various embodiments of the invention.

FIG. 1 shows a perspective view of valve 100 for inflatable apparatuses in accordance with various embodiments of the invention. The valve 100 comprises a housing 200, a sealing disc 300 (FIG. 2) and a handle 400. The handle 400 is coupled to the sealing disc 300, and is adapted for rotating the sealing disc 300 within the housing 200 (FIGS. 2-5).

The housing 200 comprises a first opening 210 and a second opening 220, and is adapted for being mounted to an inflatable apparatus such that the second opening faces the lumen of the inflatable apparatus into which it is mounted (not shown). The first opening faces the surrounding atmosphere.

Figure 2:
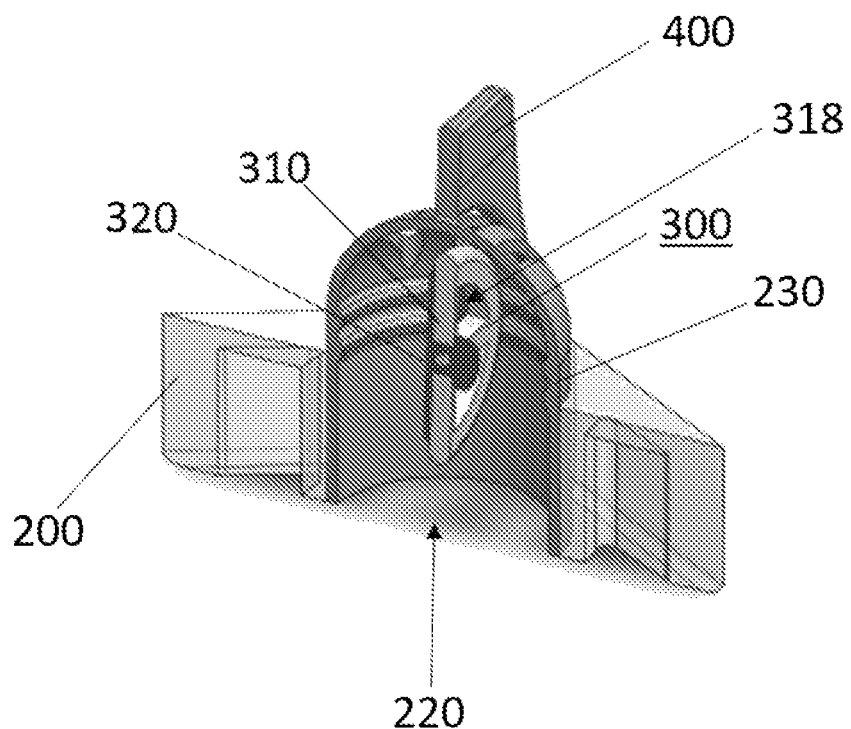
FIG. 2 shows a cross-sectional view of a valve in accordance with various embodiments of the invention, where the body member is in a released position from the inner surface side of the housing.
Figure 3:
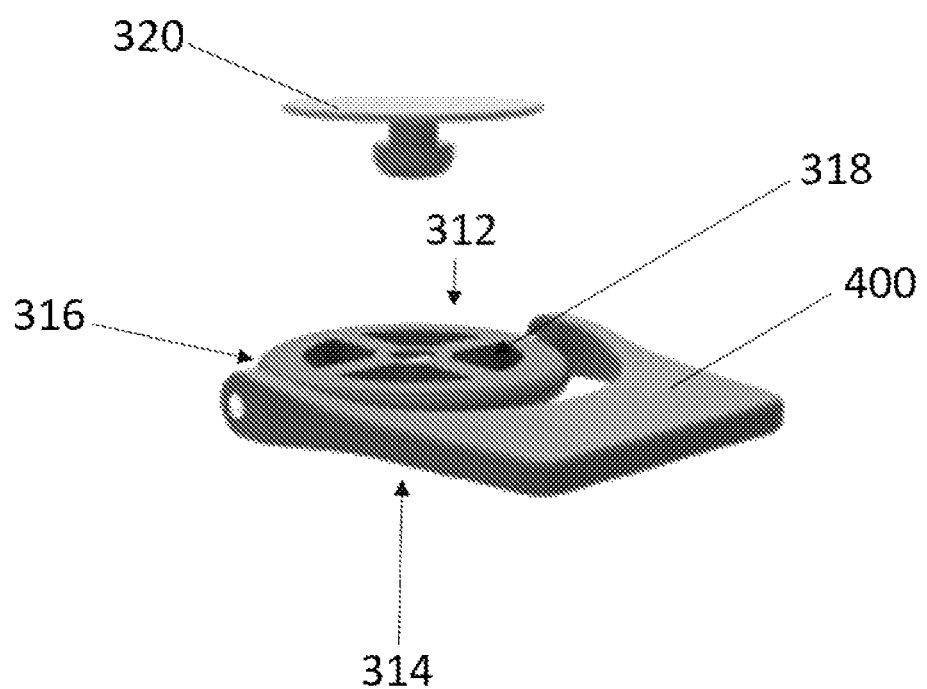
FIG. 3 shows an exploded view of the sealing disc with the handle coupled to the body member.

FIG. 2 shows a cross-sectional view of a valve 100 in accordance with various embodiments of the invention, where the body member 310 of the sealing disc 300 is in a released position from the inner surface side of the housing 200. Two perforation (holes/channels) 318 are shown. In this position, air may pass relatively unhindered through the housing 200 into or out of the lumen of the inflatable apparatus into which the valve is mounted, as the side edge 316 (FIG. 3) of the body member 310 is in a released position from the inner surface side of the housing 200. The cover plate 320 adapted for covering the perforations 318 in the body member 310 on the first surface side 312 is also shown. A part of the cover plate 320 may be lifted away from the body member 310 when pressurized air is applied to the second surface side 314 of the body member 310, such that air may pass through the one or more perforations 318.

Figure 4:
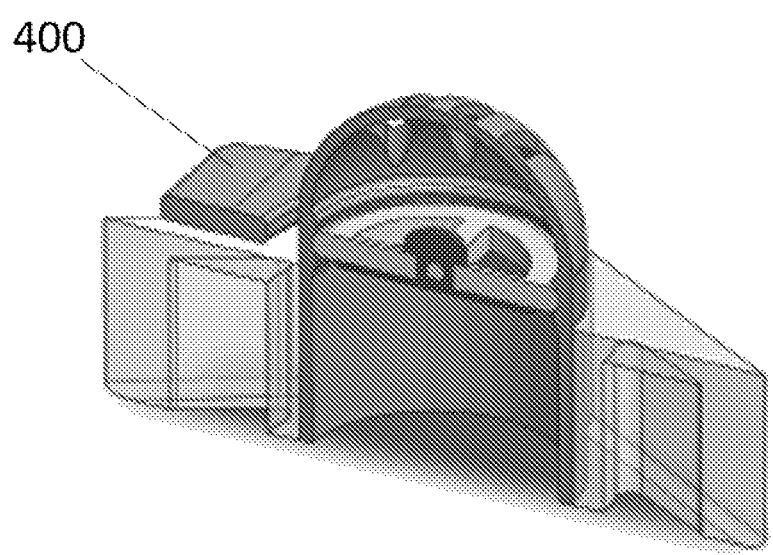
FIG. 4 shows a cross-sectional view of a valve in accordance with various embodiments of the invention, when the second surface side of the body member faces the first opening of the housing, and where the side edge of the body member is in an engaged position with the inner surface side of the housing.

FIG. 4 shows a cross-sectional view of a valve 100 in accordance with various embodiments of the invention. The second surface side 314 of the body member 310 faces the first opening 210 of the housing 200, and the side edge 316 of the body member 310 is in an engaged position with the inner surface side of the housing 200. In this position, air may pass through the housing 200 via the perforations 318 into the lumen of the inflatable apparatus into which the valve is mounted (not shown).

Figure 5:
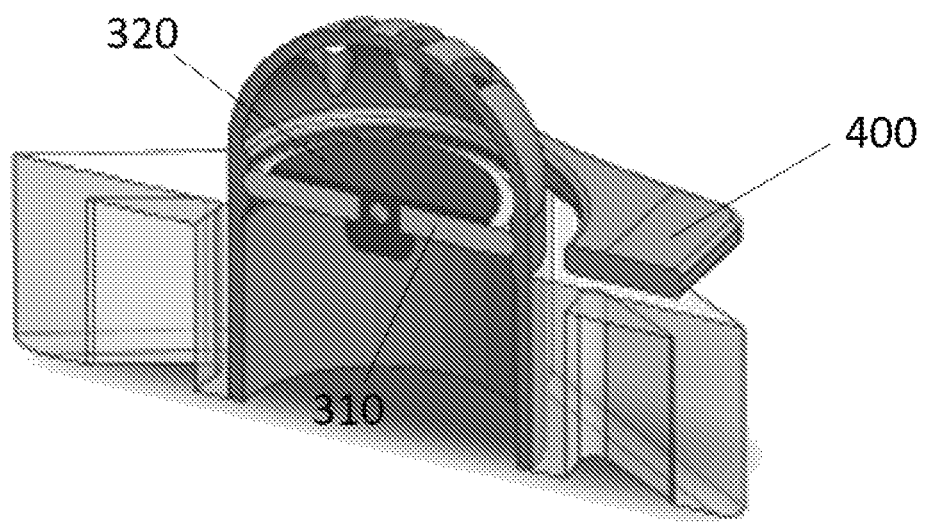
FIG. 5 shows a cross-sectional view of a valve in accordance with various embodiments of the invention, when the second surface side of the body member faces the second opening of the housing, and where the side edge of the body member is in an engaged position with the inner surface side of the housing.

FIG. 5 shows a cross-sectional view of a valve 100 in accordance with various embodiments of the invention. The second surface side 314 of the body member 310 faces the second opening 220 of the housing 200, and the side edge 316 of the body member 310 is in an engaged position with the inner surface side of the housing. In this position, air may pass through the housing 200 via the perforations 318 out of the lumen of the inflatable apparatus into which the valve is mounted (not shown) and into the surrounding atmosphere.

REFERENCES

100 Valve
200 Housing
210 First opening
220 Second opening
230 Groove
300 Sealing disc
310 Body member
312 First surface side
314 Second surface side
316 Side edge
318 Perforation (hole/channel)
320 Cover plate
400 Handle

The invention claimed is:

1. An inflatable apparatus comprising a valve, and a lumen; wherein the valve comprises: a housing with a first opening and a second opening, and mounted such that the second opening faces the lumen of said inflatable apparatus; a sealing disc adapted for rotating within an inner surface of the housing; and a handle coupled to the sealing disc, and adapted for rotating the sealing disc; wherein the sealing disc comprises a) a perforated body member with opposed first and second surface sides, and a side edge, and wherein one or more perforations extend through the body member from the first surface side to the second surface side; and b) a cover plate adapted for covering the one or more perforations in the body member on the first surface side; wherein at least a part of the cover plate is able to be lifted away from the body member when pressurized air is applied to the second surface side of the body member, such that air passes through the one or more perforations; wherein the sealing disc is configured such that the side edge of the perforated body member releasably engages with the inner surface side of the housing such that passage of air from the first opening and towards the second opening, and vice versa, is directed through the one or more perforations in the body member.

2. An inflatable apparatus according to claim 1, wherein inflatable apparatus is a self-inflating apparatus.

3. An inflatable apparatus according to claim 1, wherein the cover plate is made from a flexible material.

4. An inflatable apparatus according to claim 1, wherein the first opening is configured and dimensioned as a mouthpiece.

5. An inflatable apparatus according to claim 1, wherein the cover plate is made from a non-porous material.

6. An inflatable apparatus according to claim 1, wherein the cover plate is anchored at the center of the body member.

7. An inflatable apparatus according to claim 1, wherein the housing extends laterally into two oppositely directed plates or sheets.

8. An inflatable apparatus according to claim 1, wherein the inner surface side of the housing comprises a groove configured for receiving the side edge of the sealing disc.

9. An inflatable apparatus according to claim 1, wherein the handle is coupled to the sealing disc and rotatably coupled to the housing such that the relative position of the handle to the housing reflects the position of the side edge of the sealing disc.

10. An inflatable apparatus according to claim 1, wherein the inflatable apparatus is selected from the group consisting of mats, mattresses, and pillows.

\* \* \* \* \*